July 13, 1926.   
A. J. MACY   
1,592,034  
PROCESS AND METHOD OF EFFECTIVE ANGULAR LEVITATION OF
PRINTED IMAGES AND THE RESULTING PRODUCT
Filed Sept. 6, 1924
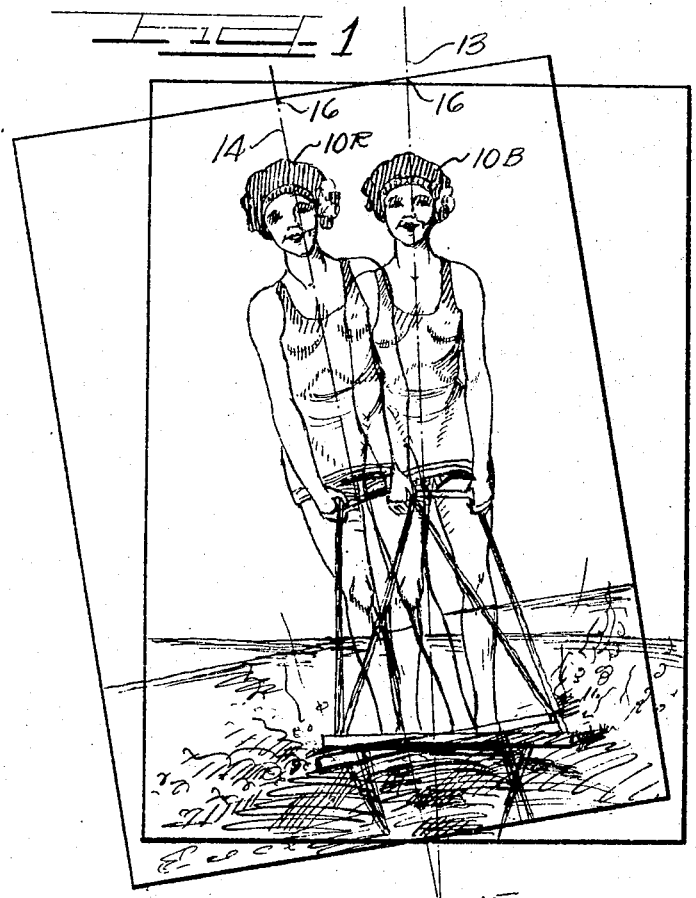
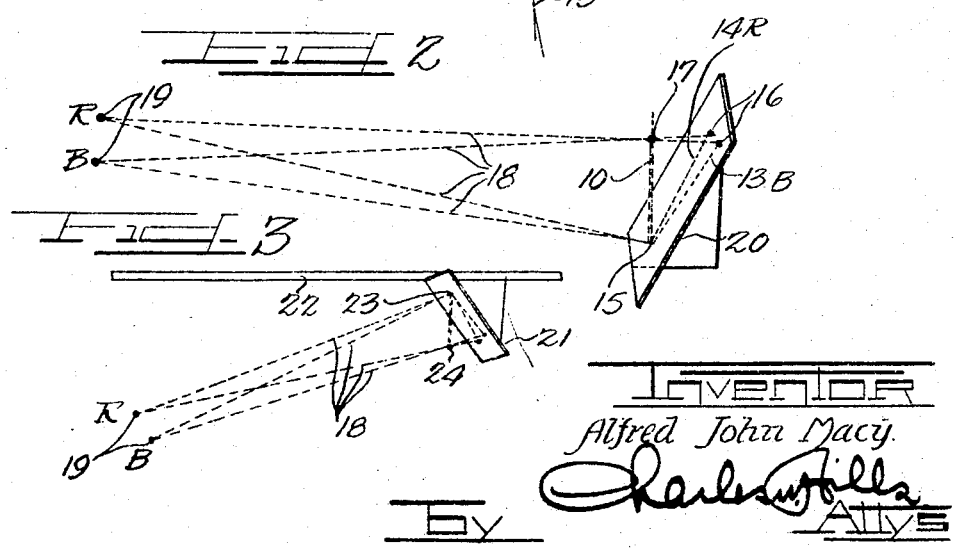
Inventor
Alfred John Macy Patented July 13, 1926.

1,592,034

UNITED STATES PATENT OFFICE.

ALFRED JOHN MACY, OF CHICAGO, ILLINOIS, ASSIGNOR TO MACY ART PROCESS CORPORATION, OF CHICAGO, ILLINOIS, A CORPORATION OF ILLINOIS.

PROCESS AND METHOD OF EFFECTIVE ANGULAR LEVITATION OF PRINTED IMAGES AND THE RESULTING PRODUCT.

Application filed September 6, 1924. Serial No. 736,269.

This invention relates to stereoscopic pictures of the general type described in my Patent No. 1,386,720 of August 9th, 1921, and particularly relates to the process and method of levitating printed images at an angle to the printed surfaces.

My prior patent, referred to above, describes a complementary color method of producing stereoscopic pictures, wherein double images are printed in nearly complementary colors adapted to be viewed through transparent eye screens having the same complementary colors, one for each eye. If for example shades of red and blue or red and green are used for the colors, red for the left eye and blue for the right eye, the image having similar colors, the red eye screens will obscure the red image and likewise the blue eye screens will obscure the blue image. The colors mentioned are simply for illustrative purposes, as other pairs of preferably nearly complementary colors may be chosen. With such a combination of images and eye screens if the printed images are registered in such a manner that the right eye view is to the left of its complement the image as viewed by both eyes projects outwardly with the plane of the printed images as a back ground.

This is highly suitable for general illustration purposes but is in a measure unsatisfactory and confusing where large illustrations are used for show window or display purposes in which it is customary to display the same on an easel or on an incline and in such cases I have found that the object illustrated tends to recline at the same angle with the horizon as the card or material upon which it is printed, thus decreasing the naturalness of the subject and tending to take the life out of the picture.

The present invention contemplates the production of an image, as viewed through color screens, wherein the image will appear to bear an angular relation to the reference plane so that when it is viewed by the observer the image will appear to stand vertically with reference to the normal horizontal plane notwithstanding the fact that the card or material upon which said image is printed may recline at an angle to the normal horizontal and if in the production of an image of a relatively long object the images of one extremity of the object are arranged in register while the images of the other end are out of register with the right eye view to the left of the complementary view, the object will appear to have the first mentioned end in the plane of the page and the other end outstanding from the page the apparent angle of inclination being approximately equal to the angle at which the page must be placed to bring the apparent image of the object into a vertical plane.

It is also an object of this invention to compensate for the distortion involved in angular displays of stereographic prints, such as for example, displays on easels or adjacent the ceilings of stores, where an angular disposition of the mounted pictures is necessary or desirable for proper visibility. Such an angular disposition of the reference plane results in an unnatural posture for the stereoscopic image unless angular levitation of the image is resorted to, to compensate for the angular position of the reference plane. The apparent position of the image may be entirely forward of the reference plane or part forward of the plane and part apparently to the rear of the plane according to the point of intersection of imaginary reference lines in the two image components.

It is also an object of this invention to provide stereograms adapted for angular mounting such as adjacent the ceilings wherein groups of individual stereograms may be assembled to illustrate various styles without the expense of mounting individual objects for inspection.

Other and further important objects of this invention will be apparent from the disclosures in the specification and the accompanying drawings.

This invention (in a preferred form) is illustrated in the drawings and hereinafter more fully described.

On the drawings;

Figure 1 is a view of two complementarily colored images superimposed upon each other so that when viewed through a suitable pair of colored screens the image will appear to stand out at an angle to the plane of the drawing.

Figure 2 is a perspective diagrammatic view illustrating the process of this invention and the results thereof.

Figure 3 is a similar diagrammatic view showing the lines of sight for a picture hung at an angle, as from a ceiling.

As shown on the drawings:

The object chosen for illustration is the picture of a bathing girl riding an aquaplane. As shown in Figure 1 two prints of this object are superimposed on the stereogram base, the prints being preferably of nearly complementary colors such as red and blue. If we assume that the eye screens used in observing the colored pictures provide a red screen for the left eye and a blue screen for the right eye then the upright image in the figure will be colored blue and will henceforth be referred to as 10 B, the imaginary centerline of the image being shown at 13. The image inclined to the left in the figure would be colored red and will be referred to as 10 R, the centerline being indicated at 14. It is to be understood that the invention is not limited to the use of the colors mentioned, as many other color combinations may be used and in fact strictly complementary colors are not necessary but are preferable because the image printed in one color is most sharply defined when seen through a screen of a nearly complementary color.

The original images from which the red and blue colored printing plates are made are produced in the usual stereoscopic manner, the two views being separated and later superimposed to produce the desired stereogram. In registering the two complementarily colored images on the paper forming the back ground, the center lines 13 and 14 are angularly displaced with regard to each other according to the desired angular levitation of the observed image. For example, as shown in Figure 1 the center lines intersect at 15 and are widely displaced at the top 16 of the two images. With such an arrangement the feet of the object will appear only slightly elevated from the surface when the right eye view is to the left of its complement, and the figure will appear to lean outwardly from the paper into the position indicated by the numeral 17 in Figure 2. The lines of sight 18 are indicated from the observer's eyes 19 in the figure, R and B indicating the respective color screens. It will be seen from the figure that the inclined back ground 20, such as would result from leaning such a picture against the wall, or mounting it on an easel, is rectified in the image as seen through the color screens, inasmuch as the image seems to stand vertically against the inclined back ground.

Where pictures 21 are to be hung from the walls or ceiling 22 at such an angle for example as in Figure 3 the angular dispersion of the complementary images is reversed to cause the head to be in the plane of the back ground at 23 and the feet to stand out therefrom as at 24. Such pictures may be used very effectively in groups about the ceilings of a store to display various styles of costumes and the like to bring out the styles in a way that the actual handling of the suits cannot approach without trying them on a model. A further advantage of such a group display is that a customer can compare the entire group each style of which appears with all the detail of cut and fit as though being worn by a model.

I am aware that many changes may be made, and numerous details of construction may be varied through a wide range without departing from the principles of this invention, and I therefore do not purpose limiting the patent granted hereon otherwise than necessitated by the prior art.

I claim as my invention:

The method of making stereograms adapted for display in a position inclined to the line of sight, comprising superimposing on the stereogram base stereoscopic images of an object in such angular relationship to each other as to neutralize the angle of inclination of the inclined stereogram and to display the image in a substantially vertical position.

In testimony whereof I have hereunto subscribed my name.

ALFRED JOHN MACY.